(12) United States Patent
Nayak

(10) Patent No.: US 6,697,230 B1
(45) Date of Patent: Feb. 24, 2004

(54) THREE-POINT FLOATING NUT FOR A HEAD POSITIONER

(75) Inventor: Ashok B. Nayak, Glendora, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 184 days.

(21) Appl. No.: 09/944,345

(22) Filed: Sep. 4, 2001

Related U.S. Application Data

(60) Provisional application No. 60/230,001, filed on Sep. 5, 2000.

(51) Int. Cl.$^7$ .................................................. G11B 5/54
(52) U.S. Cl. ..................................................... 360/267.4
(58) Field of Search ........................... 360/261.3, 261.1, 360/291.2, 128, 291, 267.4; 242/340

(56) References Cited

U.S. PATENT DOCUMENTS

| | | | | |
|---|---|---|---|---|
| 4,234,140 A | * | 11/1980 | Van Nie et al. ............ 242/340 |
| 4,747,004 A | | 5/1988 | Kukreja et al. .......... 360/261.3 |
| 5,105,322 A | * | 4/1992 | Steltzer .................... 360/261.3 |
| 5,132,858 A | | 7/1992 | Baheri ...................... 360/261.3 |
| 5,414,578 A | * | 5/1995 | Lian et al. .................... 360/291 |
| 5,448,438 A | * | 9/1995 | Kasetty .................... 360/261.3 |
| 5,537,275 A | * | 7/1996 | Peace et al. ............. 360/291.2 |
| 5,793,574 A | * | 8/1998 | Cranson et al. .......... 360/261.3 |
| 6,061,209 A | * | 5/2000 | Stephens et al. ......... 360/261.3 |
| 6,157,516 A | * | 12/2000 | Hertrich et al. ............. 360/128 |
| 6,388,836 B2 | * | 5/2002 | Anderson et al. ........... 360/128 |

* cited by examiner

Primary Examiner—Tianjie Chen
(74) Attorney, Agent, or Firm—McDermott, Will & Emery

(57) ABSTRACT

A head positioner arrangement for a tape drive includes a head positioner with a guidance system and a prime mover system, and a floating nut that is positioned between the prime mover system and the guidance system. The floating nut has a three-point contact to the prime mover system. The three-point contact absorbs errors from the prime mover system and prevents these errors from interfering with the guidance system.

19 Claims, 7 Drawing Sheets

THREE-POINT FLOATING NUT FOR A HEAD POSITIONER

RELATED APPLICATIONS

The present application claims priority of U.S. Provisional Application Serial No. 60/230,001, filed Sep. 5, 2000.

FIELD OF THE INVENTION

The present invention relates to the field of read/write head positioning, and more particularly, to arrangements for moving a read/write head by a head positioner in a manner that absorbs errors from a prime mover system.

BACKGROUND OF THE INVENTION

Recently, the demand for magnetic storage densities has increased from merely a few gigabytes to several hundred gigabytes. Magnetic tape systems are still among the most economical means of data storage. Tape storage systems having only a few gigabytes capacity have limited track densities and bit densities. During the write-read function, the head positioner of the tape storage system locates the head at the necessary track center line. The write-read process continues without making any further adjustment, even if there is an occurrence of an offset between the head gap and the track's center line. In such drives, there is an arrangement to precisely locate the head at the track's center line at the beginning of the tape, but once the write-read process begins, there is no correction performed if an offset is subsequently created between the head and the track center line.

In order to increase storage capacities to several hundred gigabytes, the track densities (defined as the number of tracks per inch) need to be increased substantially. As the track density increases, the track pitch and the track width decrease. For proper write-read operation, the magnetic head must stay at or very close to the center line of the track. Due to the narrow track pitch, this task of maintaining the head gap to the track center line is very difficult for conventional positioners. Thus, because of the narrower track pitch, the head positioner must improve in order to minimize the offset between the head and the center line of the track. In addition to increasing the track density, increasing the tape width is an alternative that increases the storage capacity. An LTO ("Linear Tape Open" format) cartridge is one of the examples of a data cartridge in which the track density as well as the tape width are increased in order to achieve a several hundred gigabyte capacity.

In order to meet the challenge of higher track densities and increased tape width, modern tape transports employ a combination of a coarse/fine head positioner. The coarse positioner moves the head approximately to the region of the data track to be written or read, and the fine positioner moves the head at the center line of the track with the necessary precision. As tape width increases, the access time to move the head from one track location to another track location becomes an issue. This requires a coarse positioning mechanism to provide a higher translational velocity.

Coarse positioner design generally comprises three main elements. These elements are the prime mover system, the guidance system, and an anti-rotation system. The function of the prime mover system is to translate the head positioner mass up or down with a required velocity. The guidance system ensures that during the translation, the head orientation with respect to the tape path of the tape transporter is kept within required tolerance limits. The anti-rotation system prevents the head positioner from rotating against the torque produced by the prime mover in forward or reverse direction.

In certain conventional arrangements, the prime mover system has two main elements; a lead screw and a nut. As the lead screw rotates, the nut is moved. The lead screw is supported at two ball bearings. In spite of the considerable efforts to produce a perfect lead screw, there are always anomalies in such a lead screw. For example, the lead screw has so-called radial and axial run-outs. The lead screw motion therefore has errors from the run-outs and misalignments of the ball bearings. Additionally, the threads on the nut would exhibit similar anomalies.

The nut used in conventional systems, moves the total positioner mass, and must couple to the head positioner mass such that the positioner translates per the specifications of the guidance system without introducing any errors from the prime mover system. More specifically, the nut must allow the total positioner mass to translate without adding any interference from the anomalies of the prime mover system. To address the issue of the anomalies of the prime mover system, the coarse positioning system should be designed to separate the functions of translating, and to provide guidance accuracy as the head translates. However, prior conventional designs utilizing the lead screw and floating nut type arrangement have failed to adequately address these concerns.

SUMMARY OF THE INVENTION

There is a need for a head positioning arrangement that provides proper isolation of the guidance system from the errors of the prime mover system while allowing the head positioner to be moved with a desired velocity.

This and other needs are met by embodiments of the present invention which provide a head positioner arrangement for a tape drive comprising a head positioner with a guidance system and a prime mover system, and means for isolating the guidance system from the prime mover system.

The earlier stated need is also met by another embodiment of the present invention that provides a head positioning arrangement for a tape drive, comprising a head positioner with a guidance system and a prime mover system, and a floating nut positioned between the prime mover system and the guidance system. The three-point feature of the floating nut is the only interface between the prime mover system and the guidance system. The three-point contact absorbs errors from the prime mover system and prevents the errors from interfering with guidance system.

The earlier stated needs are met by other embodiments of the present invention, which provide a head positioning arrangement comprising a base, a coarse positioning bracket movably mounted on the base, and a prime mover system coupled to the base for controllably moving the coarse positioning bracket relative to the base. A guidance system is coupled between the base and the coarse positioning bracket for guiding the coarse positioning bracket linearly during moving of the coarse positioning bracket by the prime mover system. A floating nut is coupled to the prime mover system and bears against the coarse positioning bracket. The floating nut has a three-point contact with the coarse positioning bracket. The coarse positioning bracket is biased against the floating nut to move in a first direction upon movement of the floating nut in the first direction by the prime mover system, and to move in a second direction against the biasing upon movement of the floating nut in the second direction by the prime mover system. The three-point contact remains in contact with the coarse positioning bracket throughout movement of the coarse positioning bracket in the first and second directions.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to the coarse and fine positioning of a write-read head of a data storage system. In particular, the present invention resolves problems related to the introduction of errors by the prime mover system into the guidance system that can affect the precise positioning of a write/read head. This isolation is accomplished, in part, by the provision of a three-point contact on the floating nut. The three-point contact absorbs errors from the prime mover system and prevents translation of those errors into the guidance system that provides the precise guidance of the head positioner assembly.

Figure 1:
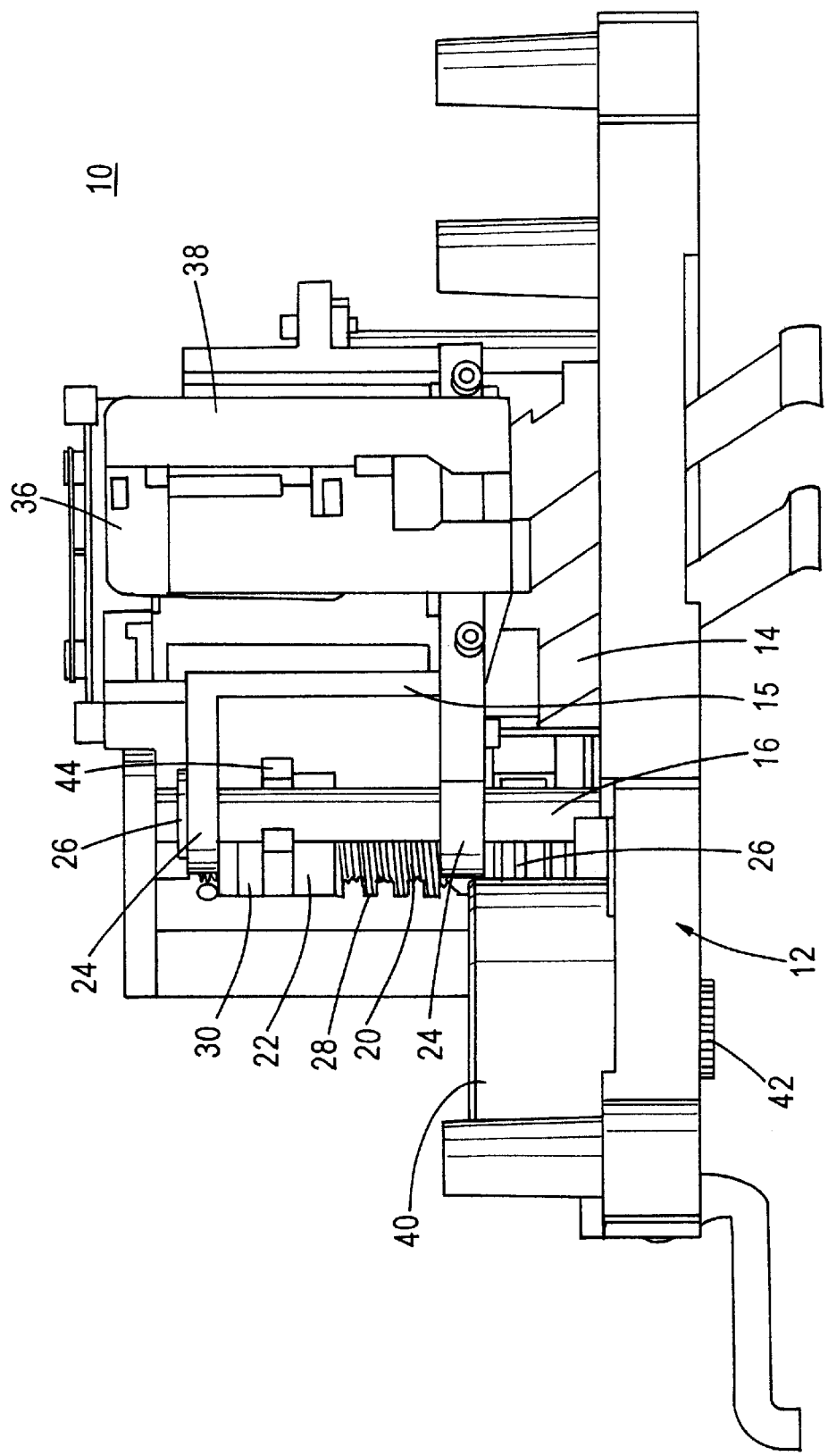
FIG. 1 is a side view of a head positioning arrangement constructed in accordance with an embodiment of the present invention.

FIG. 1 is a side view of a head positioner arrangement constructed in accordance with an embodiment of the present invention. The head positioner arrangement 10 comprises a guidance system, a prime mover system, and an anti-rotation system. A main positioner base 12 forms the base of the arrangement 10, and is stationary with respect to the coarse positioner assembly 14 and fine positioner assembly 36 as the assemblies move to position the read/write head.

Figure 2:
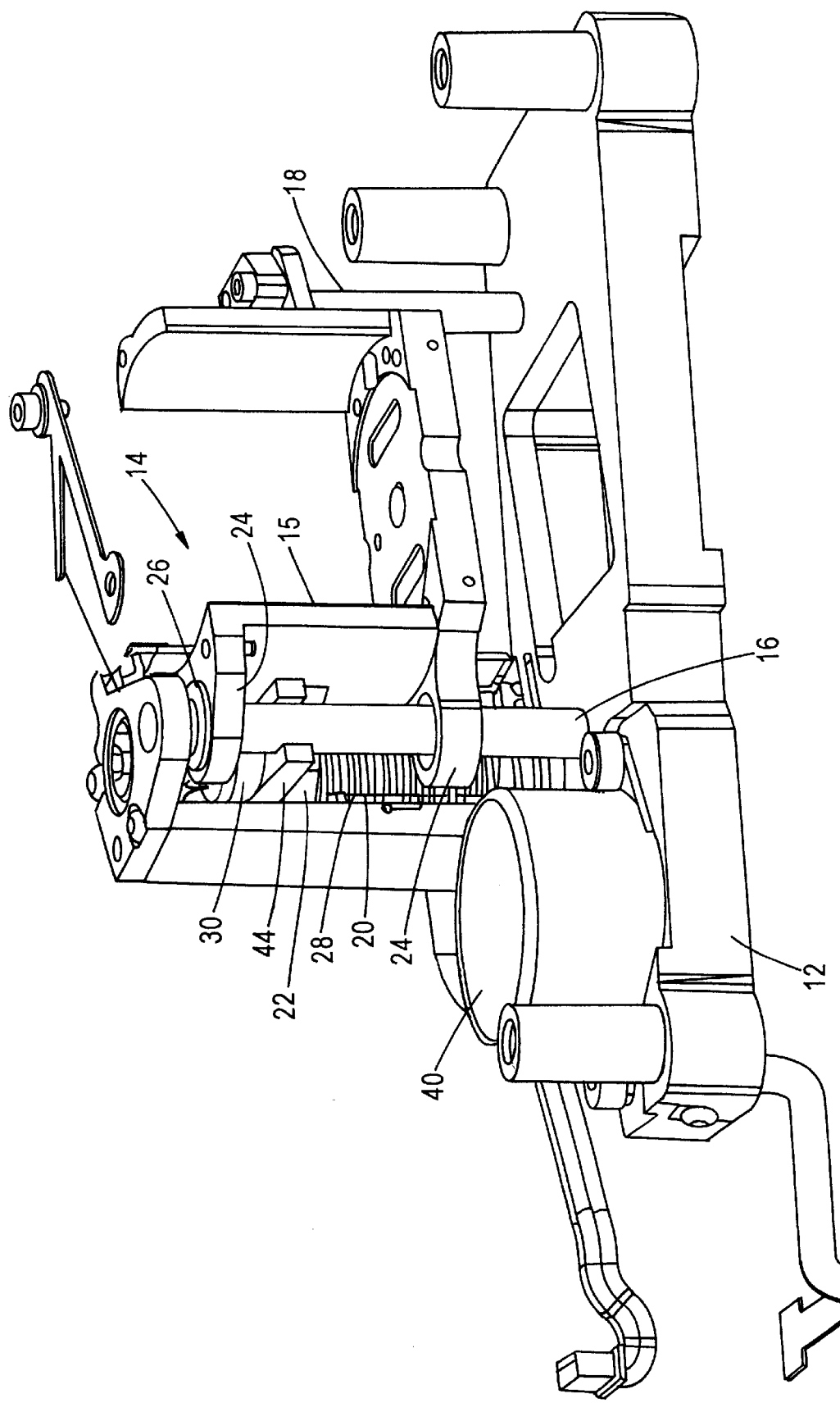
FIG. 2 is a perspective view of the head positioning arrangement of the present invention without the fine positioner assembly installed for purposes of illustration.

In FIG. 2, the fine positioner assembly 36 is not shown so as to clearly depict only the coarse positioner assembly 14 on the main positioner base 12. The coarse positioner assembly 14 includes a coarse positioning bracket 15 that is configured to hold the fine positioner assembly 36 (see FIG. 1). A first protrusion 22 has a throughhole through which a lead screw 20 extends. The lead screw 20 is connected through a gear train (not shown in FIG. 2) to a stepper motor 40 provided on the main positioner base 12. Through operation of the stepper motor 40, and the gear train, the lead screw 20 is controllably rotated.

The coarse positioning bracket 15 has second and third protrusions 24, which also have throughholes. A guide post 16 is fixed on the main positioner base 12. The guide post 16 extends through the throughholes of the second and third protrusions 24. Precision guide bushings 26 assure a precise guiding of the coarse positioning bracket 15 along the length of the guide post 16 along a vertical direction. An anti-rotation shaft 18 is provided on the main positioner base 12 and serves to prevent the entire coarse positioner assembly 14 from rotating when the lead screw 20 is rotated and the coarse positioner bracket 15 is moved up and down. In preferred embodiments of the present invention, the guide post 16 and the anti-rotation shaft 18 are made of stainless steel with good surface finishes to reduce friction.

The coarse positioner assembly 14 is urged upwardly by a preloading spring 28 whose center line of force is the center line of the lead screw 20. The preloading spring 28 is located between the first protrusion 22 and the floor of the main positioner base 12.

A floating nut 30 having a threaded hole 32 is threaded onto the lead screw 20. Rotation of the lead screw 20, through the stepper motor 28 and gear train 42, causes the floating nut 30 to move upwardly on the lead screw 20 or downwardly on the lead screw 20. When the floating nut 30 is moved downwardly on the lead screw 20, the floating nut 30 presses against the first protrusion 22 of the coarse positioner bracket 15 and acts against the preloading force provided by the preloading spring 28. A precise vertical adjustment in the downward direction (a "second direction") is thereby provided. Conversely, a precise upward adjustment of the coarse positioner assembly 14 is made by rotating lead screw 20 in the opposite direction (a "first direction"), causing the floating the nut 30 to move upwardly along the lead screw 20. This allows the preloading spring 28 to move the coarse positioning assembly 14 upwardly in a controlled manner. The anti-rotation prongs 44 on the floating nut 30 extend around the guide post 16. These anti-rotation prongs 44 prevent the coarse positioner assembly 14 from rotating against the torque produced by the stepper motor 40 and the lead screw 20 as the lead screw 20 is rotated in a forward or reverse direction.

In certain embodiments of the present invention, the material of the floating nut 30 is Acetal with Teflon which provides a very low coefficient of friction. This material is exemplary only as other materials may be used which have a low coefficient of friction.

Figure 5:
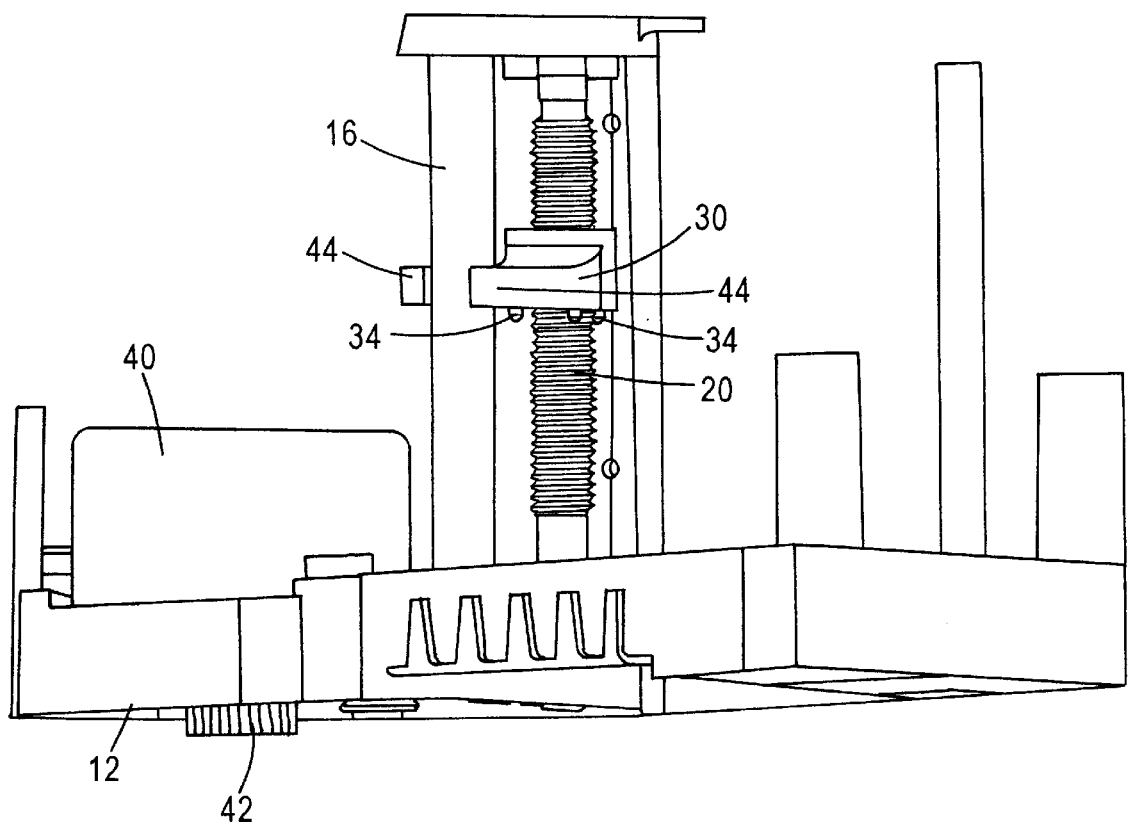
FIG. 5 is a perspective, close-up view of the floating nut on the lead screw, without the coarse positioning bracket installed, for purposes of illustration.

FIG. 5 depicts an isolated view of the floating nut 30 on the lead screw 20 without the coarse positioner bracket 15 installed, for illustration purposes. Also, the preloading spring 28 is not depicted in FIG. 5.

Figure 3:
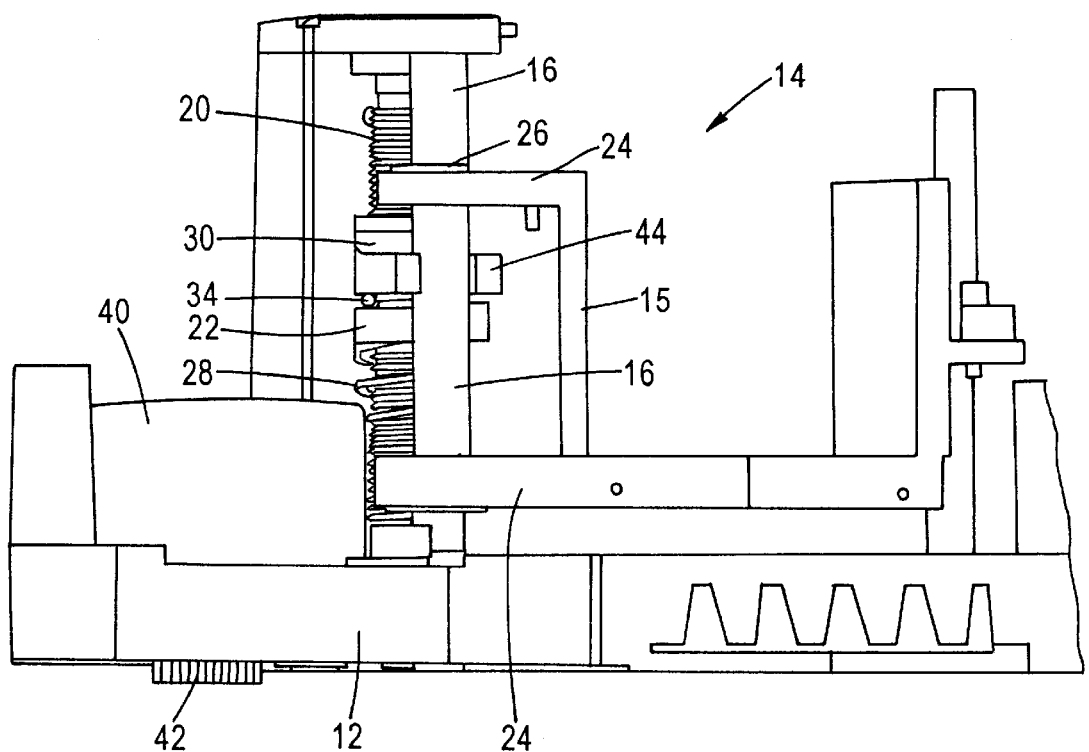
FIG. 3 is a close-up view of a portion of the coarse positioner assembly constructed in accordance with embodiments of the present invention.

FIG. 3 shows a close-up view of the prime mover system. Clearly visible in FIG. 3 is one of the three contact points 34 of the floating nut 30. As shown, the contact point 34 rests on the upper surface of the first protrusion 22. The first protrusion 22 presses against all three contact points 34 of the floating nut 30.

The guide bushings 26 are also clearly depicted in FIG. 3. These guide bushings 26 are formed with very close tolerances so as to provide a precise linear translation of the coarse positioning bracket 15 along the guide post 16.

Figure 4:
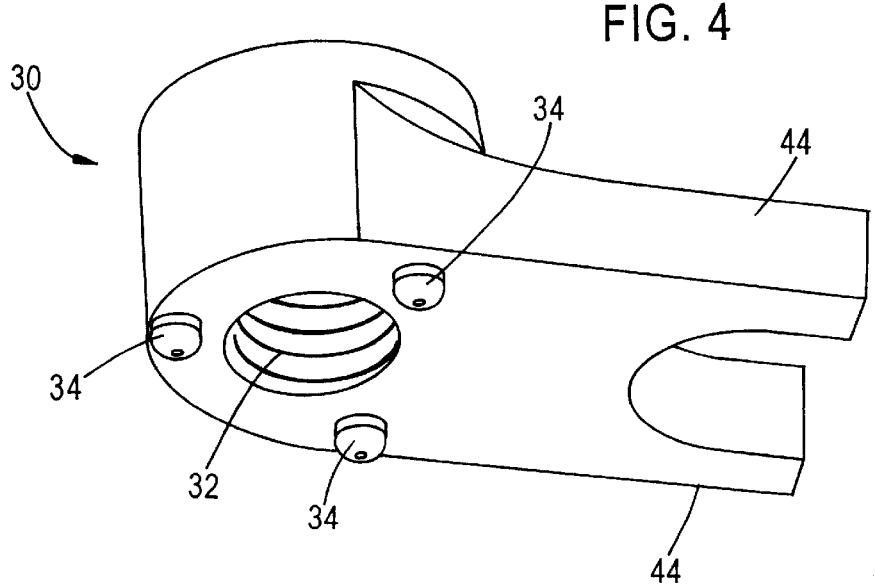
FIG. 4 is a perspective view of a floating nut constructed in accordance with embodiments of the present invention.

An embodiment of the floating nut 30 is depicted in isolation in FIG. 4. A bottom perspective view of the floating nut 30 is provided. The undersurface of the floating nut 30 includes the three contact points 34, which are generally hemispherical in shape, although other shapes may be used without departing from the scope of the invention. A threaded hole 32 is provided at one end of the floating nut 30, and is essentially located between the three contact points 34. The anti-rotation prongs 44 extend outwardly at one end of the floating nut 30.

Figure 6:
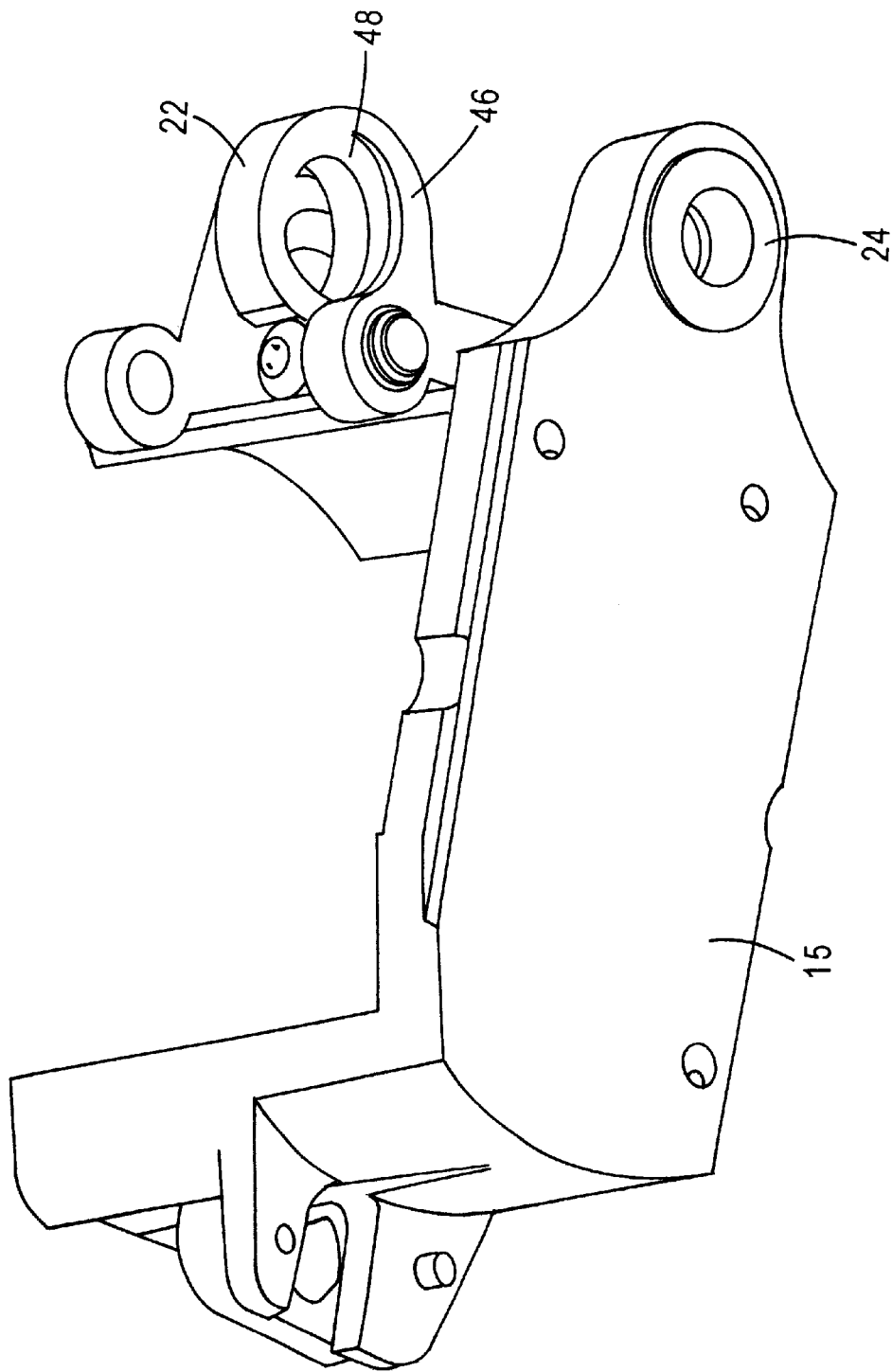
FIG. 6 is a perspective view from underneath of a coarse positioner bracket constructed in accordance with embodiments of the present invention.

FIG. 6 depicts the coarse positioner bracket 15 from underneath. The first protrusion 22 is more clearly shown in FIG. 6. The first protrusion 22 has a hole 46 through which the lead screw 20 extends. The protrusion 22 also has a recess 48 which receives the top of the preloading spring 28 to securely retain the preloading spring 28. The third protrusion 24 is depicted in FIG. 6, while the second protrusion 24 is mostly obscured by the first protrusion 22 in this depiction.

Figure 7:
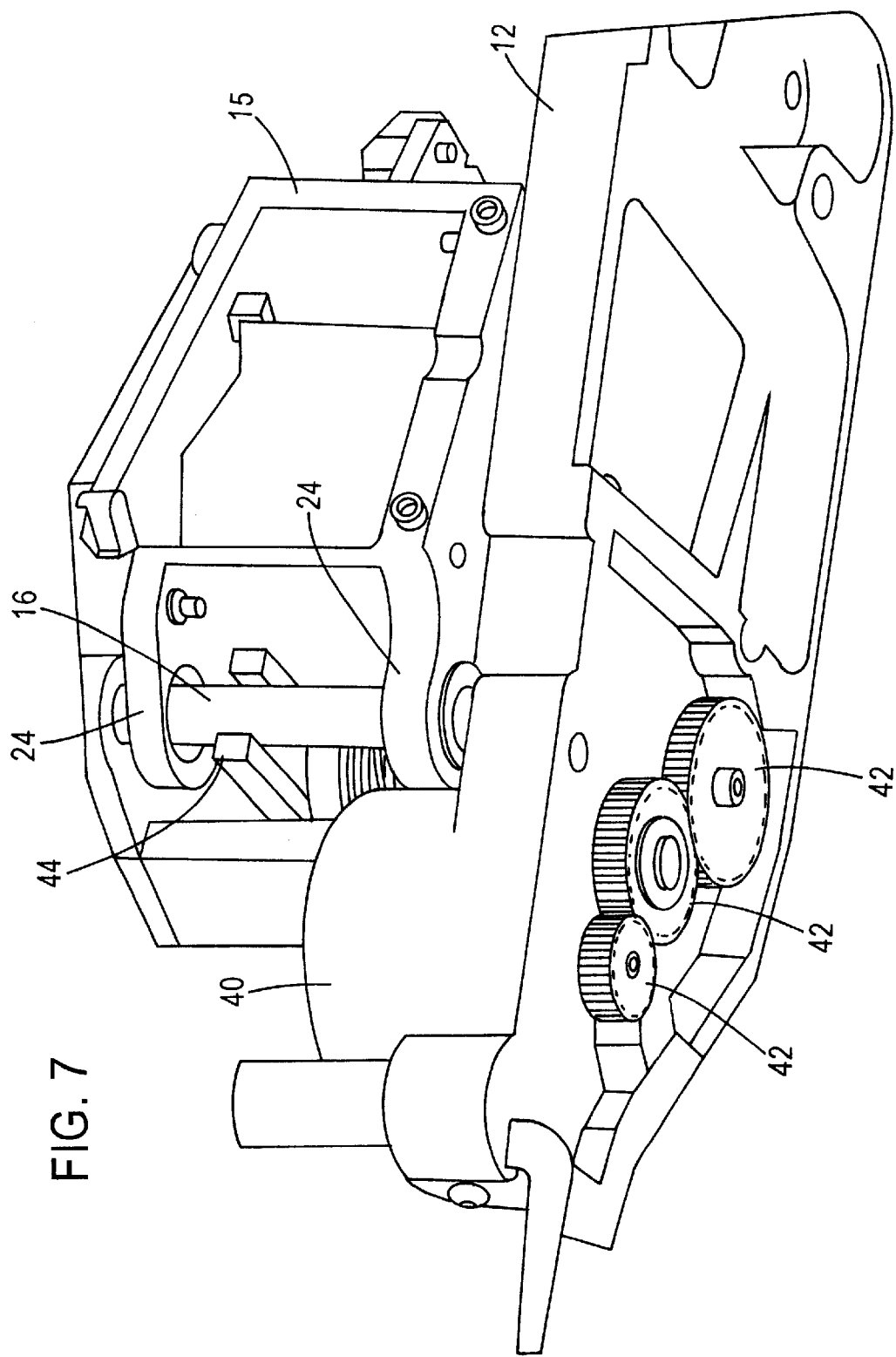
FIG. 7 is a view from underneath of the head positioning arrangement constructed in accordance with embodiments of the present invention.

FIG. 7 depicts a view of the head positioner 10 from underneath to illustrate an exemplary embodiment of a gear train 42 from the stepper motor 40 to the lead screw 20. Other arrangements for driving the lead screw 20 may be provided within the scope of the present invention.

Figure 8:
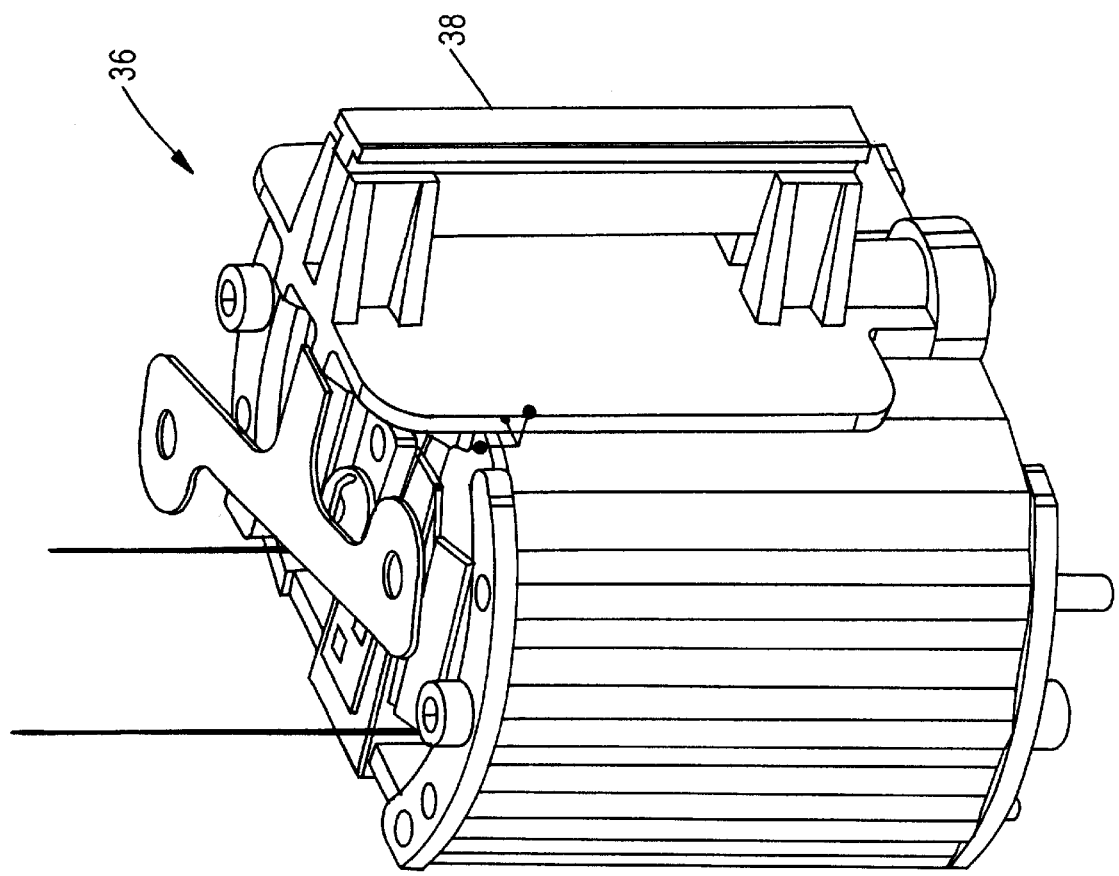
FIG. 8 depicts an embodiment of the fine positioner assembly.

An exemplary embodiment of a fine positioner assembly 36, having a read/write head 38, is shown in FIG. 8. The fine positioner assembly 36 is located on the coarse positioner bracket 15, to form the fully assembled head positioner 10, as depicted in FIG. 1. The fine positioner assembly 36 provides the necessary small fine movements utilized to place the head at the center line of the necessary track under a closed loop condition. However, the details of the fine positioner do not form part of the present invention.

In certain embodiments of the invention, the prime mover system may be considered to include the lead screw 20, the stepper motor 40, the gear train 42, and the coarse positioner assembly 14 which is movably attached to the lead screw 20. The guidance system may be considered to include the guide post 16 that extends from the main positioner bracket 12, as well as the guide bushings 26.

In operation, the floating nut 30 is positioned between the prime mover system and the guidance system and with its three-point contact to the prime mover system, absorbs errors from the prime mover system and prevents these errors from interfering with the guidance system. In other words, the three-point contact of the floating nut 30 serves to isolate the guidance system from the prime mover system in a particularly advantageous manner. The lead screw 20 is driven via the stepper motor 40 and the gear 42 to provide the necessary translations per step of the motor. As the lead screw 20 rotates, the floating nut 30 translates up or down based on the direction that the motor 40 rotates. The first protrusion 22 of the coarse positioner bracket 15 is in contact with floating nut 30 at the three contact points 34. The contacting force is determined based on the force of the preloading spring 28. The three-point contact does not separate from the first protrusion 22 as long as any external force to the assembly is less than the force from the preloading spring 28. Due to a number of anomalies from the relevant parts, the floating nut 30 is free to orient, but maintains the three-point contact to the first protrusion 22 on the coarse positioner bracket 15. Hence, the present invention achieves the goals of providing a system which absorbs errors from the prime mover system and prevents these errors from interfering with the guidance system in a head positioning arrangement. The guidance system is thereby isolated from the prime mover system errors.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A head positioning arrangement for a tape driver, comprising:
    a head positioner with a guidance system and a prime mover system; and
    a floating nut positioned between the prime mover system and the guidance system and having a three-point contact to the prime mover system, the three-point contact absorbing errors from the prime mover system and preventing the errors from interfering with the guidance system.

2. The arrangement of claim 1, further comprising a main positioner bracket, and wherein the prime mover system includes: a lead screw coupled to the main positioner bracket, and a course positioner assembly movably attached to the lead screw such that the course positioner assembly is moved linearly in response to rotation of the lead screw.

3. The arrangement of claim 2, wherein the coarse positioner assembly includes a first protrusion that includes a hole through which the lead screw extends, the first protrusion having a contact surface.

4. The arrangement of claim 3, wherein the floating nut has a threaded hole through which the lead screw extends, and a base surface on which three contact points are located, the contact points contacting the contact surface of the first protrusion to form the three-point contact to the prime mover system.

5. The arrangement of claim 4, wherein the contact points are hemispherical.

6. The arrangement of claim 4, wherein the guidance system includes a guide post extending from the main positioner bracket, the coarse positioner assembly having second and third protrusions with bores through which the guide post extends, such that the coarse positioner assembly is linearly guided by the guide post during linear movement of the coarse positioner base assembly.

7. The arrangement of claim 6, wherein the guidance system includes guide bushings fixed to the second and third protrusions and through which the guide post extends, the guide bushings providing precise translation of the coarse positioner assembly over the guide shaft.

8. The arrangement of claim 7, wherein the floating nut includes an anti-rotation extension that includes prongs extending closely around the guide shaft, the floating nut thereby preventing rotation of the coarse positioner assembly due to rotation of the lead screw.

9. The arrangement of claim 8, further comprising a preloading arrangement configured, preload the coarse positioner assembly such that the first protrusion maintains contact with the three contact points.

10. The arrangement of claim 9, wherein the preloading arrangement includes a preloading spring through which the lead screw extends, the preloading spring having a first end bearing against the main positioner bracket and a second end bearing against the first protrusion.

11. The arrangement of claim 10, wherein the preloading spring has a force sufficient to maintain contact of the first protrusion against the three contact points.

12. A head positioning arrangement comprising:
    a base;
    a coarse positioning bracket movably mounted on the base;
    a prime mover system coupled to the base for controllably moving the coarse positioning bracket relative to the base and the coarse positioning bracket for guiding the coarse positioning bracket linearly during moving of the coarse positioning bracket by the prime mover system; and a floating nut coupled to the prime mover system and bearing against the coarse positioning bracket, the floating nut having a three-point contact with the coarse positioning bracket, the coarse positioning bracket being biased against the floating nut to move in a first direction upon movement of the floating nut in the first direction by the prime mover system, and to move in a second direction against the biasing upon movement of the floating nut in the second direction by the prime mover system, the three-point contact remaining in contact with the coarse positioning bracket throughout movement of the coarse positioning bracket in the first and second directions.

13. The arrangement of claim 12, wherein the coarse positioning bracket includes a first protrusion having a first side on which the three-point contact is established with the floating nut, and a second side against which a biasing force is applied.

14. The arrangement of claim 13, wherein the prime mover system includes a lead screw on which the floating nut is threaded such that rotation of the lead screw causes the floating nut to move along the lead screw.

15. The arrangement of claim 14, further comprising a preloading spring between the base and the first protrusion, the preloading spring providing the biasing of the coarse positioning bracket against the floating nut and to maintain the first protrusion against the three-point contact of the floating nut, the three-point contact absorbing errors from the prime mover system.

16. The arrangement of claim 15, wherein the guidance system includes a guide shaft fixed to the base, second and third protrusions from the coarse positioning bracket, the second and third protrusions having holes slidably received on the guidepost, and guide bushings fixed to the second and third protrusions providing precise translation of the coarse positioning bracket over the guide shaft.

17. The arrangement of claim 16, wherein the floating nut includes an anti-rotation extension that includes prongs extending closely around the guide shaft and preventing rotation of the coarse positioning bracket against torque from the lead screw.

18. The arrangement of claim 17, wherein the three-point contact is provided by three hemispherical contacts on the floating nut.

19. The arrangement of claim 18, wherein the prime mover includes a stepper motor coupled to the lead screw.

* * * * *